US011599510B2

(12) United States Patent
Madhipatla et al.

(10) Patent No.: US 11,599,510 B2
(45) Date of Patent: Mar. 7, 2023

(54) METHODS, SYSTEMS, AND COMPUTER READABLE MEDIUMS FOR PERFORMING METADATA-DRIVEN DATA COLLECTION

(71) Applicant: EMC IP HOLDING COMPANY LLC, Round Rock, TX (US)

(72) Inventors: Venkatesh Sudarsanam Madhipatla, Westford, MA (US); Bayi Peng, Plano, TX (US); Xiaohong Fu, Plano, TX (US)

(73) Assignee: EMC IP Holding Company LLC, Round Rock, TX (US)

( * ) Notice: Subject to any disclaimer, the term of this patent is extended or adjusted under 35 U.S.C. 154(b) by 0 days.

(21) Appl. No.: 17/375,444

(22) Filed: Jul. 14, 2021

(65) Prior Publication Data

US 2021/0342309 A1    Nov. 4, 2021

Related U.S. Application Data

(63) Continuation of application No. 15/369,241, filed on Dec. 5, 2016, now Pat. No. 11,106,639.

(51) Int. Cl.
*G06F 16/188* (2019.01)
*G06F 16/13* (2019.01)
*G06F 16/23* (2019.01)
*G06F 16/245* (2019.01)
*G06F 16/25* (2019.01)
(Continued)

(52) U.S. Cl.
CPC ......... *G06F 16/188* (2019.01); *G06F 16/13* (2019.01); *G06F 16/23* (2019.01); *G06F 16/245* (2019.01)

(58) Field of Classification Search
USPC ....................................................... 707/831
See application file for complete search history.

(56) References Cited

U.S. PATENT DOCUMENTS 6,609,123 B1    8/2003   Cazemier et al.
6,618,818 B1    9/2003   Wahl et al.
(Continued)

OTHER PUBLICATIONS

Cloud Computing Services: taxonomy and comparison; C.N. Hofer; 2011; University of Twente; pp. 1-14 (Year: 2011).*
(Continued)

*Primary Examiner* — Amresh Singh
*Assistant Examiner* — Jermaine A Mincey
(74) *Attorney, Agent, or Firm* — Jenkins, Wilson, Taylor & Hunt, P.A.

(57) ABSTRACT

Methods, systems, and computer readable media for performing metadata-driven data collection are disclosed. In some examples, a method includes receiving a request for system status data for components of a distributed computing system while the distributed computing system is in operation. The request includes metadata specifying a data collection sequence for collecting component-level system status data. The components include compute components, network components, and storage components. The method includes obtaining, using the metadata, the component-level system status data by querying protocol-based data collectors in an order, one after the other, as specified by the data collection sequence specified by the metadata. The method includes assembling the component-level system status data into assembled status data and storing the assembled status data in memory and/or a repository.

14 Claims, 4 Drawing Sheets

(51) Int. Cl.
*H04L 41/00* (2022.01)
*H04L 43/04* (2022.01)
*H04L 43/0817* (2022.01)

(56) References Cited

U.S. PATENT DOCUMENTS

| | | | |
|---|---|---|---|
| 6,990,660 | B2 | 1/2006 | Moshir et al. |
| 7,392,421 | B1 | 6/2008 | Bloomstein et al. |
| 8,533,724 | B1 | 9/2013 | Theimer et al. |
| 8,639,827 | B1 | 1/2014 | Dinn et al. |
| 9,075,788 | B1 | 7/2015 | Roth et al. |
| 9,083,625 | B2 | 7/2015 | Nandyalam et al. |
| 9,473,365 | B2 | 10/2016 | Melander et al. |
| 10,587,465 | B1 | 3/2020 | Sandham |
| 11,012,298 | B2 | 5/2021 | Sandham |
| 11,106,639 | B1 | 8/2021 | Madhipatla et al. |
| 11,381,451 | B2 | 7/2022 | Sandham |
| 2003/0005090 | A1* | 1/2003 | Sullivan, Jr. ........ H04L 41/0893 709/220 |
| 2004/0143811 | A1* | 7/2004 | Kaelicke ................ G06F 8/20 717/104 |
| 2005/0198333 | A1 | 9/2005 | Dinges et al. |
| 2006/0129599 | A1 | 6/2006 | Hammerich |
| 2006/0161563 | A1 | 7/2006 | Besbris et al. |
| 2008/0082546 | A1 | 4/2008 | Meijer et al. |
| 2010/0049753 | A1 | 2/2010 | Prahlad et al. |
| 2010/0050173 | A1 | 2/2010 | Hensbergen |
| 2012/0110055 | A1 | 5/2012 | Van Biljon et al. |
| 2015/0234682 | A1 | 8/2015 | Dageville et al. |
| 2015/0236971 | A1 | 8/2015 | Sesha et al. |
| 2020/0213196 | A1 | 7/2020 | Sandham |

OTHER PUBLICATIONS

Notice of Allowance and Interview Summary for U.S. Appl. No. 17/242,769 (dated Apr. 27, 2022).
Notice of Allowance and Fee(s) Due for U.S. Appl. No. 15/369,241 (dated May 11, 2021).
Commonly-assigned, Co-pending U.S. Appl. No. 17/242,769 for "Methods, Systems, and Computer Readable Mediums for Selecting and Configuring a Computing System to Support a Replicated Application," (Unpublished, filed Apr. 28, 2021).
Notice of Allowance and Fee(s) Due for U.S. Appl. No. 16/752,050 (dated Mar. 10, 2021).
Non-Final Office Action for U.S. Appl. No. 16/752,050 (dated Oct. 7, 2020).
Non-Final Office Action for U.S. Appl. No. 15/369,241 (dated May 7, 2020).
Advisory Action for U.S. Appl. No. 15/369,241 (dated Jan. 30, 2020).
Commonly-assigned, co-pending U.S. Appl. No. 16/752,050 for "Methods, Systems, and Computer Readable Mediums For Selecting And Configuring a Computing System to Support a Replicated Application," (Unpublished, filed Jan. 24, 2020).
Notice of Allowance and Fee(s) Due for U.S. Appl. No. 14/626,358 (dated Nov. 20, 2019).
Final Office Action for U.S. Appl. No. 15/369,241 (dated Nov. 15, 2019).
Non-Final Office Action for U.S. Appl. No. 15/369,241 (dated Jul. 18, 2019).
Advisory Action for U.S. Appl. No. 15/369,241 (dated May 31, 2019).
Non-Final Office Action for U.S. Appl. No. 14/626,358 (dated May 3, 2019).
Final Office Action for U.S. Appl. No. 15/369,241 (dated Mar. 19, 2019).
Pre-Brief Appeal Conference Decision for U.S. Appl. No. 14/626,358 (dated Jan. 22, 2019).
Advisory Action for U.S. Appl. No. 14/626,358 (dated Oct. 26, 2018).
Non-Final Office Action for U.S. Appl. No. 15/369,241 (dated Aug. 31, 2018).
Final Office Action for U.S. Appl. No. 14/626,358 (dated Jul. 13, 2018).
Non-Final Office Action for U.S. Appl. No. 14/626,358 (dated Dec. 29, 2017).
Advisory Action for U.S. Appl. No. 14/626,358 (dated Nov. 17, 2017).
Final Office Action for U.S. Appl. No. 14/626,358 (dated Aug. 25, 2017).
Non-Final Office Action for U.S. Appl. No. 14/626,358 (dated Feb. 13, 2017).
Commonly-assigned, co-pending U.S. Appl. No. 15/369,241 for "Methods, Systems, and Computer Readable Mediums for Performing Metadata-Driven Data Collection," (Unpublished, filed Dec. 5, 2016).
Commonly-assigned, co-pending U.S. Appl. No. 14/626,358 for "Methods, Systems, and Computer Readable Mediums for Selecting and Configuring a Computing System to Support a Replicated Application," (Unpublished, filed Feb. 19, 2015).
Wu et al., "Query-Driven Data Collection and Data Forwarding in Intermittently Connected Mobile Sensor Networks," DMSN, pp. 1-6 (2010).

\* cited by examiner

300

| | Sequence Number | Protocol | Namespace | Element Type | Field Name |
|---|---|---|---|---|---|
| 302 | 1 | SMI | CONFIG | ARRAY | ELEMENTNAME |
| 304 | 2 | SMI | CONFIG | DISK | DISKTYPE |
| 306 | 2 | SNMP | CONFIG | PORT | CATEGORY |
| 308 | * | SNMP | METRIC | CPU | CPUUTILPERCENTAGE |

FIG. 3

METHODS, SYSTEMS, AND COMPUTER READABLE MEDIUMS FOR PERFORMING METADATA-DRIVEN DATA COLLECTION

PRIORITY CLAIM

This application is a continuation of U.S. patent application Ser. No. 15/369,241 filed Dec. 5, 2016, the disclosure of which is incorporated herein by reference in its entirety.

TECHNICAL FIELD

The subject matter described herein relates to data collection. More specifically, the subject matter relates to methods, systems, and computer readable mediums for performing metadata-driven data collection.

BACKGROUND

Management software for managing a distributed computing system can include user interfaces for managing, monitoring, viewing, and/or configuring one or more components (e.g., physical resources and/or virtual resources) within or associated with the distributed computing system. In some cases, the management software includes data collection software for obtaining and providing information about specific components of the distributed computing system. For example, the management software may use hard-coded software (e.g., drivers) to gather configuration information and/or other data about a component, e.g., a storage disk or processor. However, since data collection functions in management software are generally hard-coded for each managed component, such data collection mechanisms are generally inefficient, cumbersome, and/or error-prone.

SUMMARY

Methods, systems, and computer readable media for performing metadata-driven data collection are disclosed. In some examples, a method includes receiving a request for system status data for components of a distributed computing system while the distributed computing system is in operation. The request includes metadata specifying a data collection sequence for collecting component-level system status data. The components include compute components, network components, and storage components. The method includes obtaining, using the metadata, the component-level system status data by querying protocol-based data collectors in an order, one after the other, as specified by the data collection sequence specified by the metadata. The method includes assembling the component-level system status data into assembled status data and storing the assembled status data in memory and/or a repository.

BRIEF DESCRIPTION OF THE DRAWINGS

FIG. 3 is a diagram illustrating a portion of example metadata specifying a data collection sequence.

DETAILED DESCRIPTION

Management software for managing a distributed computing system can, in some cases, handle data collection using software agents and/or drivers for each component being managed. Each software agent and/or driver is designed to communicate with an application programming interface (API) associated with the component, to collect data about the component, and to store the collected data in a database. Unfortunately, in some systems, the software agent and/or driver, including the type of data to be collected and instructions for how to collect the data, are hard-coded. To support any new data or metric for a component, a corresponding software agent and/or driver will generally require software updates and/or code changes.

Hard-coded data collection techniques are generally inefficient and cumbersome to maintain and, further, generally lack scalability. This specification describes methods, systems, and computer readable media for implementing a metadata-driven data collection engine that overcomes one or more of these issues. The data collection engine is programmed to obtain, using metadata, component-level system status data by querying protocol-based data collectors in an order, one after the other, as specified by a data collection sequence specified by the metadata. Specifying a data collection sequence can provide one or more of various advantages, such as implementing data collectors that are dependent on the execution of other data collectors and implementing data assembly that builds objects from component-level system status data as the data collection sequence is executed.

Figure 1:
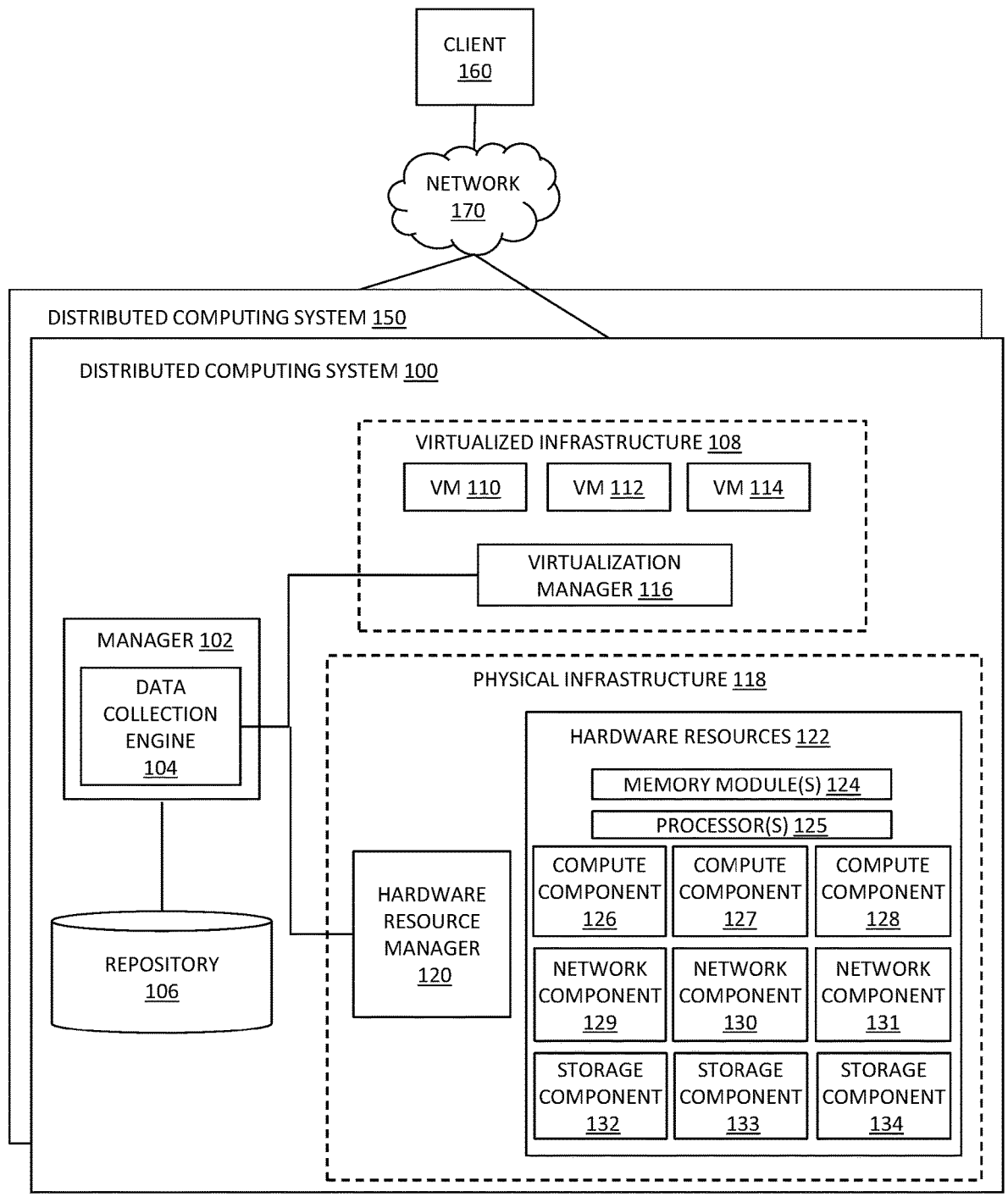
FIG. 1 is a block diagram illustrating two distributed computing systems.

FIG. 1 is a block diagram illustrating two distributed computing systems 100 and 150. The first distributed computing system 100 is shown in further detail and will be described further below. The second distributed computing system 150 may be configured similarly to the first distributed computing system 100 and is shown to illustrate that a client computing system 160 may communicate with multiple distributed computing systems over a data communications network 170.

The distributed computing system 100 can be configured to provide, e.g., data management services, cloud computing services, or any other appropriate type of computing service. The client system 160 can be implemented, for example, as software executing on one or more processors or a web-based interface. The client system 160 can be programmed for allowing a human operator or automated system to communicate with the distributed computing system 100.

The distributed computing system 100 includes a system manager 102, a data repository 106, a virtualized infrastructure 108, and a physical infrastructure 118. The system manager 102 can be configured to manage performance, resource utilization levels, and other aspects associated with virtualized infrastructure 108 and/or physical infrastructure 118. In some examples, the system manager 102 includes or provides a graphical user interface (GUI), a command-line interface (CLI), an application programming interface (API), and/or or other communications interface. For example, the system manager 102 can provide a web-based GUI usable for managing the virtualized infrastructure 108 and/or the physical infrastructure 118.

The virtualized infrastructure 108 can include a virtualization environment configured to simulate components of a computing device, such as a processor, system memory, and a storage device, for executing one or more virtual machines (VMs) (e.g., VM 110, VM 112, and VM 114). The virtual machines can be configured to perform various functions and/or services, such as web server functions or cloud application services, and can interact with various nodes, components, and/or users. The virtualized infrastructure 108 includes a virtualization manager 116 configured to allow logical entities to be created, deleted, or modified. The virtualization manager 116 can be any suitable computing entity (e.g., software executing in a virtual machine) for managing aspects associated with the virtualized infrastructure 108.

The physical infrastructure 118 can include physical or hardware resources 122, such as memory module(s) 124, processor(s) 125, compute components 126, 127, and 128, network components 129, 130, and 131, and storage components 132, 133, and 134. In some examples, the network components 129, 130, and 131 (e.g., network switches) can be configured to enable communication between the components in the distributed computing system 100. The hardware resource manager 120 can be any suitable computing entity (e.g., software executing in a virtual machine) for managing aspects associated with the physical infrastructure 118. For example, the hardware resource manager 120 can provision the hardware resources 122 for implementing one or more virtual entities in the virtualized infrastructure 108.

The processor(s) 125 can include, e.g., a microprocessor, a central processing unit (CPU), or any other like hardware based processing unit. In some examples, some aspects of the disclosed subject matter can be stored in the memory module(s) 124, which can include random access memory (RAM), read only memory (ROM), optical read/write memory, cache memory, magnetic read/write memory, flash memory, or any other non-transitory computer readable medium. In some examples, the processor(s) 125 and memory module(s) 124 can be used to execute, implement, and/or manage the operation of some aspects of the disclosed subject matter. In some examples, each of storage components 132, 133, and 134 includes a storage medium or storage unit that is configured to store information accessible by the processor(s) 125 via a system bus. In some examples, the repository 106 can utilize the storage components 132, 133, and 134 and/or the memory module(s) 124.

The system manager 102 can be programmed to interact with one or more management applications (e.g., a third-party application at the client system 160). For example, a network management system (NMS) executing at the client system 160 may send data collection requests to the system manager 102 for collecting information about various components in the distributed computing system 100. The system manager 102 may initiate data collection based on metadata provided in the data collection requests. The system manager 102 may provide the collected data to the NMS or another computing entity (e.g., as indicated by the metadata in the data collection requests).

The system manager 102 can comprise or interact with an example data collection engine 104. The data collection engine 104 can be any suitable computing entity (e.g., hardware, firmware, and/or software executing on a processor) for performing one or more aspects associated with performing metadata-driven data collection. For example, data collection engine 104 can be configured to receive a request for system related data, to obtain the system related data using at least one protocol-based data collector, and to store the system related data in a memory and/or a repository 106.

The client system 160 or other computing entity may provide metadata for data collection using a web-based interface, such as a web page, a file (e.g., an XML file), an API, or other interface. For example, an application (e.g., a third-party management application) may initiate data collection by providing metadata, e.g., via an API or other interface to data collection engine 104. In this example, metadata may be provided in various formats (e.g., a comma-separated values (CSV) format or an XML related format) and may include configuration information usable for configuring a data collector for data collection.

In operation, the data collection engine 104 constitutes a special purpose computing system. The data collection engine 104 can improve the technological field of data collection by allowing metadata (e.g., provided by various entities and/or at various times) to be used for configuring one or more data collectors for obtaining information about distributed computing systems and components of distributed computing systems. The data collection engine 104 provides a technical solution for existing problems in data collection by using configurable (e.g., metadata-driven) data collectors queried in a data collection sequence, thereby allowing data collection to be flexible and dynamic, e.g., without requiring software updates for data collectors when new and/or different information is requested.

Figure 2:
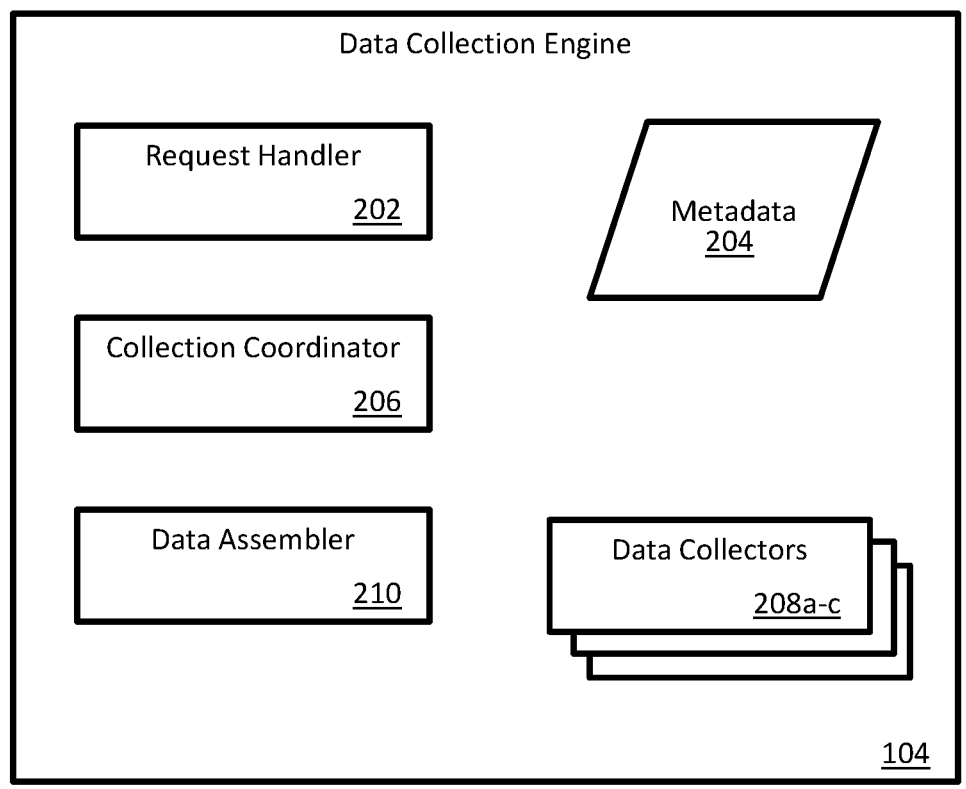
FIG. 2 is a block diagram of the example data collection engine.

FIG. 2 is a block diagram of the example data collection engine 104. The data collection engine 104 is configured for performing metadata-driven data collection. The data collection engine 104 includes a request handler 202 for receiving and responding to requests for component-level system status data that include metadata 204, a collection coordinator 206 for coordinating data collection by protocol-based data collectors 208a-c, and a data assembler 210 for assembling component-level system status data into system-level system status data.

The request handler 202 is configured for receiving requests for system status data. The request handler 202 can extract metadata 204 from the requests. The metadata 204 specifies a data collection sequence for collecting at least some component-level system status data responsive to the request. The request handler 202 responds to the requests with the requested system status data, which typically includes the component-level system status data after the data assembler 210 has assembled the component-level system status data into system-level system status data, e.g., a number of objects representing components or groups of related components.

In general, the collection coordinator 206 configures the data collectors 208a-c, using the received metadata 204, to obtain particular data about particular components. The metadata 204 can indicate what data to collect, how often data collection is to occur, where collected data should be stored or sent, how collected data is to be formatted or provided, and/or how to correlate and/or analyze sets of collected data. The metadata 204 specifies, for at least some of the component-level system status data, the data collection sequence so that at least some earlier-executing data collectors can be assured to execute before some later-executing data collectors.

For example, the collection coordinator 206 can obtain status data for a virtual machine (VM). VM configuration information can be collected using a VMWare VSphere API. If a storage related application is executing in a guest operating system (OS) in the VM, one attribute that may be requested for collection is the version number of the storage related application. Instead of requiring a user to login to the VM using secure shell (SSH) and then access the version number associated with the storage related application, the collection coordinator 206 can use the metadata 204 to invoke two data collectors, an SSH collector and a VMWare VSphere API collector. The SSH collector may obtain the version number using SSH and the VMWare VSphere API collector may obtain VM configuration information, such as memory capacity, storage capacity, hostname, an Internet protocol (IP) address, etc. using a VMWare VSphere API.

The data assembler 210 can be configured for combining and/or formatting various aspects of collected information for a particular computing entity. For example, suppose that the collection coordinator 206 collects different types of VM data using different collectors, e.g., an SSH collector and a VMWare VSphere API collector, as specified by the metadata 204. The data assembler 210 may use the metadata 204 for assembling the different types of VM data into system-level system status data, e.g., a particular report for displaying to a user. The request handler 202 can respond to a request by transmitting the report.

In some examples, the request handler 202 can include or utilize one or more communications interfaces, e.g., a GUI, a CLI, an API, or other interface, for receiving and sending data collection related information (e.g., data collection requests, metadata, and/or data collection responses). For example, a user can request, using a representation state transfer (REST) API related message, information about a particular distributed computing system or list of components of a distributed computing system in a data collection request. The request handler 202 can provide, using a REST API related message, a data collection response containing requested data associated with the data collection request.

In general, at least some of the data collectors 208a-c are protocol-based collectors. For example, a data collector may be configured for obtaining data from various components (e.g., storage disks, storage arrays, ports, processors, and network switches) using a SNMP or SNMP variant. In another example, a data collector may be configured for obtaining information about a VM using SNMP, SNI, and/or other protocols or APIs. In some examples, a protocol-based data collector can use a particular protocol for communicating with one type of component or various types of components. For instance, an SNMP data collector can be configured for collecting data about a switch or a cabinet/rack like Panduit.

In some examples, one or more of the data collectors 208a-c are component-specific data collectors. A component-specific data collector collects data from a particular device or data source irrespective of the protocol(s) or API(s) used by the device or data source. For examples, a VM data collector may be a component-specific data collector and may be capable of collecting data about a VM using multiple protocols or APIs.

Since the metadata 204 specifies data collection information, the data collected by the data collection engine 104 can be changed periodically, aperiodically, and/or dynamically, e.g., via a REST API, by updating the metadata 204. For example, instead of requiring a data collector to be updated when attributes or metrics are added or changed for a given distributed computing system, a client system 160 can provide updated metadata such that the data collector or code therein is (re)configured to collect the new data. In this example, the data collector or code therein need not be updated since what the data collector collects is not defined in the code but is instead controlled or determined by the metadata 204. For example, the metadata 204 can be injected using a spring framework.

In some examples, the metadata 204 specifies a schedule for data collection or related events. For example, the metadata 204 may indicate that certain data (e.g., associated with a particular component or namespace) may be collected periodically (e.g., every hour) and may indicate that other data may be collected dynamically or aperiodically, e.g., based on network conditions, user preferences, and/or triggered by user interactions. In some examples, the metadata 204 can specify rules for data persistency and/or related management of collected data. In such embodiments, metadata may indicate whether collected data is stored, where collected data is stored, how long collected data is stored, and/or where and/or when collected data is sent elsewhere.

In some examples, the metadata 204 specifies rules for the data assembler 210 to use in correlating and/or formatting data collected using different data collectors and/or data collected from different components or systems. For example, the metadata 204 may indicate that data from two data collectors are to be combined or correlating into a single report about a VM. In this example, the data assembler 210 may identify related collected data by inspecting the collected data and correlating data associated with the VM (e.g., as indicated by a unique identifier associated with the VM).

In another example, the metadata 204 may indicate that data associated with two or more different distributed computing systems are to be used for generating a metric or KPI. The data assembler 210 may use the metadata 204 to identify the relevant collected data (e.g., using object identifiers associated with the distributed computing systems) and use the relevant collected data to generate the metric or KPI. By using the metadata 204 to define relationships, correlation procedures, and/or data analysis steps, cross domain correlation may be performed with minimal code support in data collectors.

Since the metadata 204 specifies the data collection sequence, the collection coordinator 206 obtains the requested system status data by querying at least some earlier-executing data collectors before some later-executing data collectors. For example, the collection coordinator 206 may query a first data collector, and, after receiving a response from the first data collector, query a second data collector using the response from the first data collector. Suppose that the first data collector provides a list of network component identifiers and addresses for each identifier. The second data collector can obtain status from each of the network components on the list using the network addresses, but the second protocol-based data collector is dependent on the first data collector successfully returning the list.

Continuing the example described in the previous paragraph, the data assembler 210 can assemble the component-level system status data using a first attribute received from the first data collector for updating an assembled object with a second attribute received from the second data collector. For example, the collection coordinator 206 can, from the first data collector, receive the first attribute and a common attribute that is common to both of the responses from the first and second data collectors. Then, the collection coordinator 206 receives, from the second data collector, the second attribute and the common attribute. The data assembler 210 associates the first and second attributes and the common attribute in the assembled object.

In that case, the metadata 204 specifying the data collection sequence can allow for assembled objects to include a greater range of associated data. For example, consider an example of collecting data from a network switch. The collection coordinator 206 can first use an SNMP collector to obtain the IP address and an application-specific identifier of the network switch. The collection coordinator 206 can then use an SSH collector to obtain status data from the network switch, and, using the SSH collector, receive both security information for the network switch and the IP address of the network switch. Then, the data assembler 210 can then determine that both response contain the same IP address and, in response, associate the security information with the application-specific identifier.

In another example, the collection coordinator 206 can, as specified by the metadata 204, query a first data collector followed by a second data collector in a first pass. Then, the collection coordinator 206 can query first data collector using a response from the second data collector in the first pass. For example, the first pass may obtain identifiers and network addresses of some components, and then the second pass may obtain communication attributes of those components.

FIG. 3 is a diagram illustrating a portion of example metadata 300 specifying a data collection sequence. The metadata 300 is illustrated as a number of rows 302, 304, 306, and 308 of a table. Each row specifies a collection event for system status data to be collected by a data collector.

The "Sequence Number" column lists a sequence number for each row. Collection events in rows having lower sequence numbers are to be completed before rows having higher sequence numbers. So, in this example, the metadata 300 specifies that row 302 is to be executed before rows 304 and 306 since row 302 has a sequence number of "1" which is lower than the sequence number of "2" for rows 306 and 308. Rows 304 and 306 can be executed in parallel or one after the other. Row 308 lacks a sequence number (or contains a wildcard character) indicating that the collection event for row 308 can be executed in any order.

The table representing the metadata 300 includes columns (fields) for a protocol, a namespace, an element type, and a field name. The protocol field can comprise a protocol name and/or a related identifier indicating a protocol usable for obtaining data, such as "SMI", "SNMP", "VM REST API", "VM API", and/or other protocols. The namespace field can comprise a data descriptor or data set identifier for indicating types of data, such as "CONFIG", "METRIC", or other types. For example, a distributed computing system may have different types or sets of information, such as configuration information (e.g., a resource type) and metric information (e.g., a performance indicator). The element type field can comprise element type identifiers for indicating a component type and/or a related data store containing relevant information to be collected, such as "ARRAY", "DISK", "PORT", "CPU", "VM", and/or other types. The field name field can comprise field name identifiers for indicating a field name associated with a data store containing relevant information to be collected, such as "ELEMENTNAME", "DISKTYPE", "CATEGORY", "CPUUTILPERCENTAGE", and/or other types.

Figure 4:
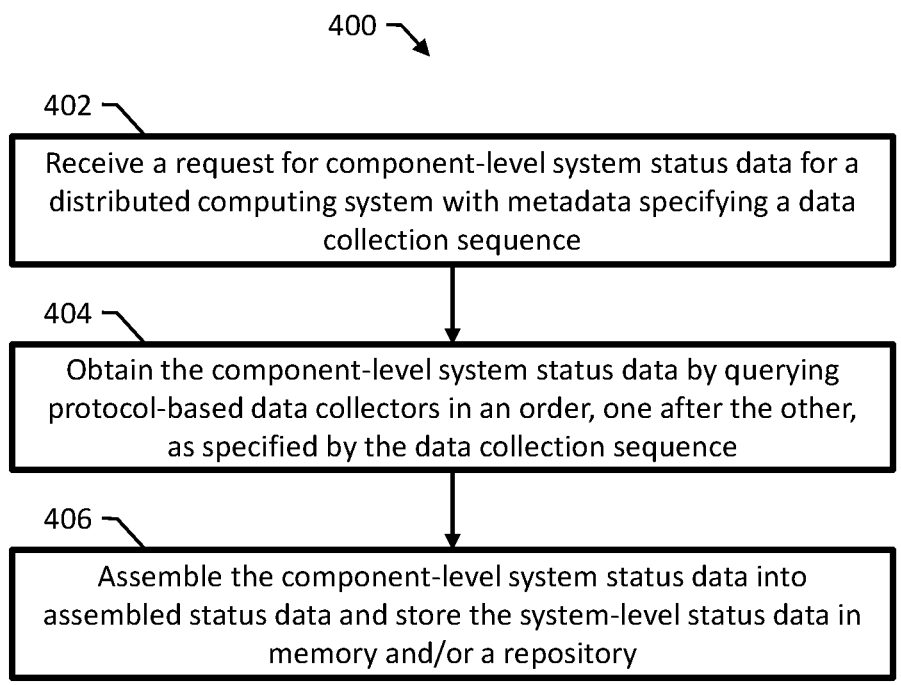
FIG. 4 is a flow diagram illustrating a method for performing metadata-driven data collection.

FIG. 4 is a flow diagram illustrating a method 400 for performing metadata-driven data collection. The method 400 is performed by a management computer system including at least one processor and memory. For example, the management computer system can be the system manager 102 of FIG. 1 or a computer system in communication with the system manager 102 of FIG. 1.

The method 400 includes receiving a request for system status data for components of a distributed computing system while the distributed computing system is in operation (402). The request includes metadata specifying a data collection sequence for collecting component-level system status data. The components of the distributed computing system include compute components, network components, and storage components.

The method 400 includes obtaining, using the metadata, the component-level system status data by querying protocol-based data collectors in an order, one after the other, as specified by the data collection sequence specified by the metadata (404). For example, obtaining the component-level system status data can include querying a first protocol-based data collector, and, after receiving a response from the first protocol-based data collector, querying a second protocol-based data collector using the response from the first protocol-based data collector. In another example, obtaining the component-level system status data includes, in a first pass, querying a first protocol-based data collector and then a second protocol-based data collector, and then, in a second pass, querying the first protocol-based data collector using a response from the second protocol-based data collector in the first pass.

The method 400 includes assembling the component-level system status data into assembled status data and storing the assembled status data in the memory and/or a repository (406). For example, assembling the component-level system status data comprises using a first attribute received from a first protocol-based data collector for updating an assembled object with a second attribute received from a second protocol-based data collector. Updating an assembled object can include associating the first and second attributes and the common attribute in an assembled object such as a report.

It will be understood that various details of the subject matter described herein can be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method comprising:

receiving, by a data collection engine executing on at least one processor of a management computer system, a request for system status data for a plurality of components of a distributed computing system while the distributed computing system is in operation, wherein the request includes metadata specifying a data collection sequence for collecting component-level system status data, and wherein the plurality of components of the distributed computing system includes a plurality of compute components, a plurality of network components, and a plurality of storage components;

obtaining, by the data collection engine and using the metadata, the component-level system status data by querying a plurality of protocol-based data collectors in an order, one after the other, as specified by the data collection sequence specified by the metadata, wherein obtaining the component-level system status data comprises querying a first protocol-based data collector and then, after querying the first protocol-based data collector, querying a second protocol-based data collector according to the data collection sequence and using the response from the first protocol-based data collector; and assembling, by the data collection engine, the component-level system status data into assembled status data and storing the assembled status data in memory of the management computer system, wherein assembling the component-level system status data comprises using a first attribute received from the first protocol-based data collector for updating an assembled object with a second attribute received from the second protocol-based data collector;

wherein querying the first protocol-based data collector comprises receiving the first attribute and a common attribute, wherein querying the second protocol-based data collector comprises receiving the second attribute and the common attribute, and wherein updating the assembled object comprises associating the first and second attributes and the common attribute in the assembled object, and wherein the common attribute is a unique identifier of a virtual machine, and wherein associating the first and second attributes and the common attribute in the assembled object comprises combining the first attribute and the second attribute into a report about the virtual machine.

2. The method of claim 1, wherein obtaining the component-level system status data comprises querying a first protocol-based data collector, and, after receiving a response from the first protocol-based data collector, querying a second protocol-based data collector using the response from the first protocol-based data collector.

3. The method of claim 1, wherein obtaining the component-level system status data comprises, in a first pass, querying a first protocol-based data collector and then a second protocol-based data collector, and then, in a second pass, querying the first protocol-based data collector using a response from the second protocol-based data collector in the first pass.

4. The method of claim 1, wherein the metadata specifies a schedule of data collection events, and wherein querying the protocol-based data collectors in the order as specified by the data collection sequence comprises querying the protocol-based data collectors in response to determining that a current time matches a scheduled data collection event.

5. The method of claim 1, comprising receiving an update to the metadata and repeating the obtaining and assembling of the component-level system status data using the update to the metadata without recompiling executable code of the protocol-based data collectors.

6. A system comprising:
at least one processor and memory; and
a data collection engine implemented using the at least one processor, wherein the data collection engine is programmed for:
receiving a request for system status data for a plurality of components of a distributed computing system while the distributed computing system is in operation, wherein the request includes metadata specifying a data collection sequence for collecting component-level system status data, and wherein the plurality of components of the distributed computing system includes a plurality of compute components, a plurality of network components, and a plurality of storage components;
obtaining, using the metadata, the component-level system status data by querying a plurality of protocol-based data collectors in an order, one after the other, as specified by the data collection sequence specified by the metadata, wherein obtaining the component-level system status data comprises querying a first protocol-based data collector and then, after querying the first protocol-based data collector, querying a second protocol-based data collector according to the data collection sequence and using the response from the first protocol-based data collector; and
assembling the component-level system status data into assembled status data and storing the assembled status data in the memory, wherein assembling the component-level system status data comprises using a first attribute received from the first protocol-based data collector for updating an assembled object with a second attribute received from the second protocol-based data collector;
wherein querying the first protocol-based data collector comprises receiving the first attribute and a common attribute, wherein querying the second protocol-based data collector comprises receiving the second attribute and the common attribute, and wherein updating the assembled object comprises associating the first and second attributes and the common attribute in the assembled object, and wherein the common attribute is a unique identifier of a virtual machine, and wherein associating the first and second attributes and the common attribute in the assembled object comprises combining the first attribute and the second attribute into a report about the virtual machine.

7. The system of claim 6, wherein obtaining the component-level system status data comprises querying a first protocol-based data collector, and, after receiving a response from the first protocol-based data collector, querying a second protocol-based data collector using the response from the first protocol-based data collector.

8. The system of claim 6, wherein obtaining the component-level system status data comprises, in a first pass, querying a first protocol-based data collector and then a second protocol-based data collector, and then, in a second pass, querying the first protocol-based data collector using a response from the second protocol-based data collector in the first pass.

9. The system of claim 6, wherein the metadata specifies a schedule of data collection events, and wherein querying the protocol-based data collectors in the order as specified by the data collection sequence comprises querying the protocol-based data collectors in response to determining that a current time matches a scheduled data collection event.

10. The system of claim 6, wherein the data collection engine is programmed for receiving an update to the metadata and repeating the obtaining and assembling of the component-level system status data using the update to the metadata without recompiling executable code of the protocol-based data collectors.

11. A non-transitory computer readable medium storing executable instructions that, when executed by at least one processor of a computer system, cause the computer system to perform operations comprising:
receiving a request for system status data for a plurality of components of a distributed computing system while the distributed computing system is in operation, wherein the request includes metadata specifying a data collection sequence for collecting component-level system status data, and wherein the plurality of components of the distributed computing system includes a plurality of compute components, a plurality of network components, and a plurality of storage components;
obtaining, using the metadata, the component-level system status data by querying a plurality of protocol-based data collectors in an order, one after the other, as specified by the data collection sequence specified by the metadata, wherein obtaining the component-level system status data comprises querying a first protocol-based data collector and then, after querying the first protocol-based data collector, querying a second protocol-based data collector according to the data collection sequence and using the response from the first protocol-based data collector; and assembling the component-level system status data into assembled status data and storing the assembled status data in memory of the computer system, wherein assembling the component-level system status data comprises using a first attribute received from the first protocol-based data collector for updating an assembled object with a second attribute received from the second protocol-based data collector;

wherein querying the first protocol-based data collector comprises receiving the first attribute and a common attribute, wherein querying the second protocol-based data collector comprises receiving the second attribute and the common attribute, and wherein updating the assembled object comprises associating the first and second attributes and the common attribute in the assembled object, and wherein the common attribute is a unique identifier of a virtual machine, and wherein associating the first and second attributes and the common attribute in the assembled object comprises combining the first attribute and the second attribute into a report about the virtual machine.

12. The non-transitory computer readable medium of claim 11, wherein obtaining the component-level system status data comprises querying a first protocol-based data collector, and, after receiving a response from the first protocol-based data collector, querying a second protocol-based data collector using the response from the first protocol-based data collector.

13. The non-transitory computer readable medium of claim 11, wherein the metadata specifies a schedule of data collection events, and wherein querying the protocol-based data collectors in the order as specified by the data collection sequence comprises querying the protocol-based data collectors in response to determining that a current time matches a scheduled data collection event.

14. The non-transitory computer readable medium of claim 11, wherein the operations comprise receiving an update to the metadata and repeating the obtaining and assembling of the component-level system status data using the update to the metadata without recompiling executable code of the protocol-based data collectors.

* * * * *